United States Patent
Mizutani (10) Patent No.: US 12,311,838 B2
(45) Date of Patent: May 27, 2025

(54) VEHICLE LAMP INFORMATION NOTIFICATION DEVICE, VEHICLE LAMP INFORMATION NOTIFICATION SYSTEM, VEHICLE LAMP INFORMATION NOTIFICATION METHOD, AND NON-TRANSITORY STORAGE MEDIUM

(71) Applicant: TOYOTA JIDOSHA KABUSHIKI KAISHA, Aichi-ken (JP)

(72) Inventor: Wataru Mizutani, Miyosi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 173 days.

(21) Appl. No.: 18/351,496

(22) Filed: Jul. 13, 2023

(65) Prior Publication Data

US 2024/0083354 A1    Mar. 14, 2024

(30) Foreign Application Priority Data

Sep. 8, 2022   (JP) ................ 2022-143267

(51) Int. Cl.
   B60Q 11/00    (2006.01)
   B60R 16/023   (2006.01)

(52) U.S. Cl.
   CPC ........ B60Q 11/005 (2013.01); B60R 16/0234 (2013.01)

(58) Field of Classification Search
   CPC ............ B60Q 11/005; B60R 16/0234
   USPC ...................................... 340/458
   See application file for complete search history.

(56) References Cited

U.S. PATENT DOCUMENTS

| | | | | |
|---|---|---|---|---|
| 3,886,517 A * | 5/1975 | Ohtake | ................. | F16D 66/024 340/459 |
| 4,190,830 A * | 2/1980 | Bell | ..................... | B60Q 11/005 340/642 |
| 5,075,669 A * | 12/1991 | Nakadozono | .......... | B60Q 11/00 340/642 |
| 6,157,296 A * | 12/2000 | Endoh | .................... | B60Q 11/00 315/83 |
| 10,688,920 B1 * | 6/2020 | Neubauer | .............. | B60Q 1/507 |
| 2008/0211647 A1 * | 9/2008 | Yamada | ................. | B60Q 11/00 340/438 |
| 2017/0259729 A1 * | 9/2017 | Balasundrum | ........... | B60Q 1/44 |
| 2019/0344846 A1 * | 11/2019 | Ohno | ..................... | G07C 5/008 |
| 2021/0301992 A1 * | 9/2021 | Jaranson | ............... | G09F 21/048 |

FOREIGN PATENT DOCUMENTS

| | | |
|---|---|---|
| JP | 2003-044610 A | 2/2003 |
| JP | 2019-197477 A | 11/2019 |
| JP | 2021-064530 A | 4/2021 |

* cited by examiner

Primary Examiner — Kerri L McNally
(74) Attorney, Agent, or Firm — HAUPTMAN HAM, LLP (57) ABSTRACT

An information notification device includes a central processing unit. The central processing unit is configured to acquire information on the state of deterioration of a vehicle lamp of a vehicle, and is configured to propose replacement or maintenance of a lens of the vehicle lamp and also propose customization of the vehicle lamp, based on the information.

8 Claims, 8 Drawing Sheets

VEHICLE LAMP INFORMATION NOTIFICATION DEVICE, VEHICLE LAMP INFORMATION NOTIFICATION SYSTEM, VEHICLE LAMP INFORMATION NOTIFICATION METHOD, AND NON-TRANSITORY STORAGE MEDIUM

CROSS-REFERENCE TO RELATED APPLICATION

This application claims priority to Japanese Patent Application No. 2022-143267 filed on Sep. 8, 2022, incorporated herein by reference in its entirety.

BACKGROUND

1. Technical Field

The present disclosure relates to vehicle lamp information notification devices, vehicle lamp information notification systems, vehicle lamp information notification methods, and non-transitory storage media.

2. Description of Related Art

Japanese Unexamined Patent Application Publication No. 2003-44610 (JP 2003-44610 A) discloses a repair reception system for a communication terminal. In this repair reception system, a user calls a repair shop before sending his or her communication terminal in for repair, and receives a reception number from the repair shop if repair is necessary. The user drops off the communication terminal with the reception number at a convenience store for shipment. The repair can thus be accepted without requiring the user to bring the communication terminal directly to the repair store.

SUMMARY

However, the method of JP 2003-44610 A cannot be applied to parts that tend to deteriorate over time such as headlamps of vehicles, because users cannot remove them. There is also a demand for services that can be differentiated from other maintenance shops and dealerships.

The present disclosure provides a vehicle lamp information notification device, vehicle lamp information notification system, vehicle lamp information notification method, and non-transitory storage medium capable of providing a differentiated service when dealing with aged deterioration of vehicle lamps.

A vehicle lamp information notification device according to an aspect of the present disclosure includes a central processing unit. The central processing unit is configured to acquire information on a state of deterioration of a vehicle lamp of a vehicle, and is configured to propose replacement or maintenance of a lens of the vehicle lamp and also propose customization of the vehicle lamp, based on the information.

The vehicle lamp information notification device proposes the replacement or the maintenance of the lens based on the information on the state of deterioration of the vehicle lamp of the vehicle. This can encourage the user to have the lens replaced or maintained. In particular, deterioration of the lens may reduce the illuminance of light emitted forward in the front-rear direction of the vehicle from the vehicle lamp. Therefore, the safety performance of the vehicle can be maintained by regularly encouraging replacement or maintenance of the lens.

Moreover, proposing the customization of the vehicle lamp can encourage the user to have the vehicle lamp customized at the timing of replacement or maintenance of the lens. As described above, by proposing the customization of the vehicle lamp at the same time as proposing the actions to be taken to deal with aged deterioration of the vehicle lamp, it is possible to differentiate from companies etc. that only deal with aged deterioration of the vehicle lamp. It is also possible to save the user the trouble of separately having the vehicle lamp customized. As used herein, "maintenance of the lens" is a concept of improving the condition of the lens by, for example, repairing or rework the lens without replacing the lens.

The central processing unit included in the above vehicle lamp information notification device may be configured to propose the maintenance of the lens when a degree of deterioration of the lens is low, and may be configured to propose the replacement of the lens when the degree of deterioration of the lens is high.

The vehicle lamp information notification device provides different proposals depending on the degree of deterioration of the lens. Therefore, aged deterioration of the vehicle lamp can be improved by a method with less burden on the user. For example, when the degree of deterioration of the lens is low such as when the lens is clouded, the deterioration can be improved without replacing the lens. On the other hand, when the degree of deterioration of the lens is high such as when the lens is yellowed, the lens needs to be replaced. Therefore, providing different proposals depending on the degree of deterioration of the lens makes it easier for the user to estimate the cost required to improve the aged deterioration of the lens.

The central processing unit included in the above vehicle lamp information notification device may be configured to propose the replacement or the maintenance of the lens based on at least one of the following: total on-time of the vehicle lamp, a traveled distance of the vehicle, accumulated illuminance, and captured image information of the lens.

The vehicle lamp information notification device proposes the replacement or the maintenance of the lens based on at least one of the following: the total on-time of the vehicle lamp, the traveled distance of the vehicle, the accumulated illuminance, and the captured image information of the lens. This improves the accuracy of estimating the degree of aged deterioration of the lens compared with the case where, for example, the degree of aged deterioration of the lens is determined based only on the number of days of use.

The central processing unit included in the vehicle lamp information notification device may be configured to acquire part information for the customization of the vehicle lamp, and may be configured to propose the customization of the vehicle lamp based on the acquired part information.

The vehicle lamp information notification device acquires the part information for the customization of the vehicle lamp. It is therefore possible to propose customization suitable for the vehicle owned by the user.

A vehicle lamp information notification system according to an aspect of the present disclosure includes: the vehicle lamp information notification device according to the above aspect; and the vehicle including the vehicle lamp.

The vehicle lamp information notification system acquires information on the state of deterioration of the vehicle lamp from the vehicle, and stores the acquired information in an external server etc. The vehicle lamp information notification system proposes replacement or maintenance of the lens and customization of the vehicle lamp based on the state of deterioration. This can encourage the user of the vehicle to have the vehicle lamp customized.

In the above vehicle lamp information notification system, the lens of the vehicle lamp may be configured to be replaced, and a sealing material that seals between the lens and a housing may be configured to be replaced.

In the vehicle lamp information notification system, each of the lens and the sealing material is configured to be replaced. Therefore, only the lens can be easily replaced without replacing the entire vehicle lamp.

A vehicle lamp information notification method according to an aspect of the present disclosure includes: acquiring information on a state of deterioration of a vehicle lamp of a vehicle; and proposing replacement or maintenance of a lens of the vehicle lamp and also proposing customization of the vehicle lamp, based on the information.

A non-transitory storage medium according to an aspect of the present disclosure stores instructions that are executable by one or more processors and that cause the one or more processors to perform functions. The functions include: acquiring information on a state of deterioration of a vehicle lamp of a vehicle; and proposing replacement or maintenance of a lens of the vehicle lamp and also proposing customization of the vehicle lamp, based on the information.

As described above, the vehicle lamp information notification device, vehicle lamp information notification system, vehicle lamp information notification method, and non-transitory storage medium according to the present disclosure can provide a differentiated service when dealing with aged deterioration of vehicle lamps.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle lamp information notification system S including a vehicle lamp information notification device 10 according to an embodiment will be described with reference to the drawings.

Figure 1:
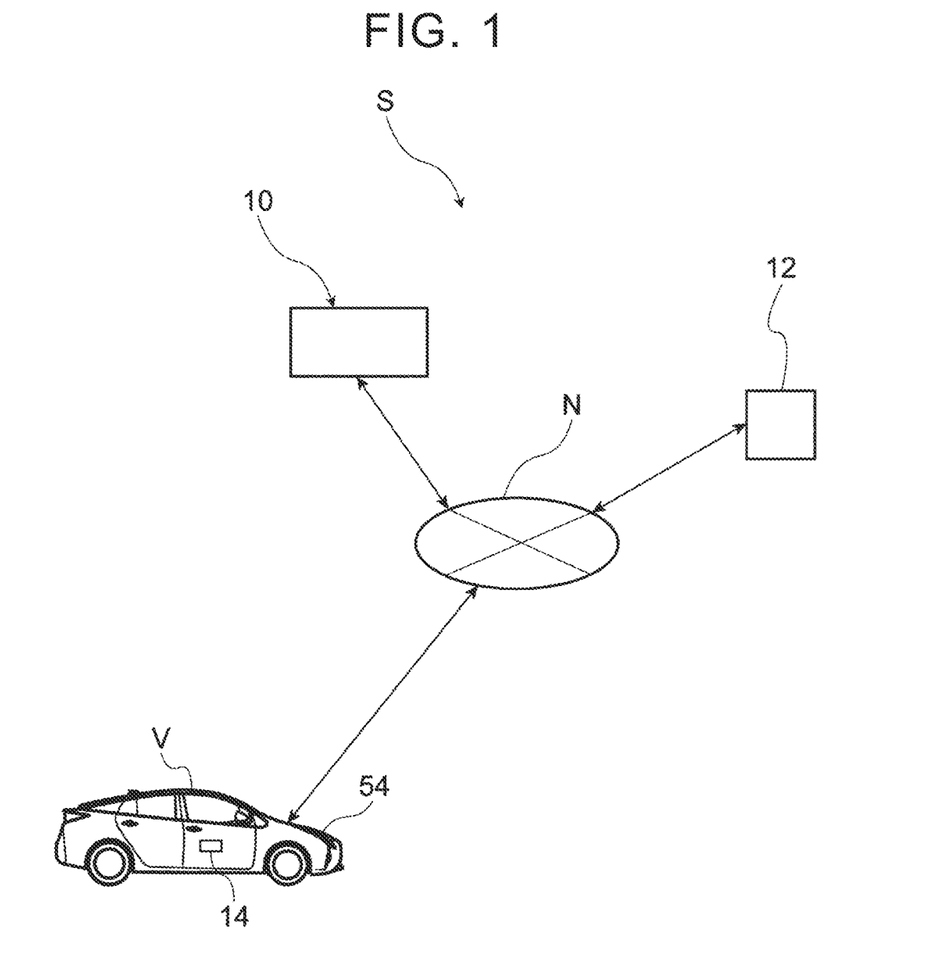
FIG. 1 is a schematic diagram showing an overall configuration of a vehicle lamp information notification system according to an embodiment.

As shown in FIG. 1, the vehicle lamp information notification system S of the present embodiment includes the vehicle lamp information notification device 10, a server 12, and a vehicle V including an in-vehicle device 14. The vehicle lamp information notification device 10, the server 12, and the in-vehicle device 14 are connected by a network N. Although a plurality of vehicles V is connected to the network N, only one vehicle V is shown in FIG. 1 for convenience of explanation.

The vehicle lamp information notification device 10 of the present embodiment is, for example, an information processing device provided outside the vehicle V. The server 12 is provided outside the vehicle V. The server 12 stores various types of data for determining the state of deterioration of a headlamp 54 serving as a vehicle lamp. The in-vehicle device 14 is, for example, an electronic control unit (ECU) mounted on the vehicle V, and is a control device that controls the headlamp 54 and senses the state of the vehicle V. In FIG. 1, the size of the in-vehicle device 14 is shown exaggerated for convenience of explanation.

In the vehicle lamp information notification system S of the present embodiment, the server 12 stores information on the state of deterioration of the headlamp 54 acquired from the in-vehicle device 14. The vehicle lamp information notification device 10 acquires the state of deterioration of the headlamp 54 from the server 12. The vehicle lamp information notification device 10 then proposes replacement or maintenance of a lens of the headlamp 54 and also proposes customization of the headlamp 54, based on the state of deterioration of the headlamp 54.

Hardware Configuration of Vehicle Lamp Information Notification Device 10

Figure 2:
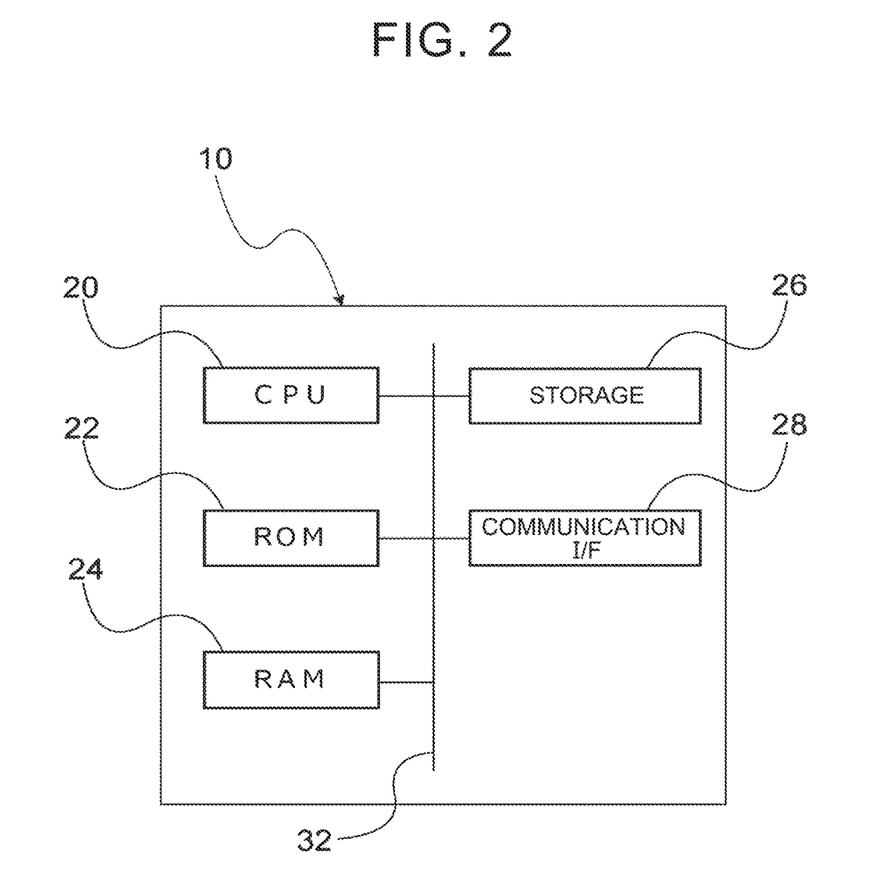
FIG. 2 is a block diagram showing a hardware configuration of a vehicle lamp information notification device according to the embodiment.

FIG. 2 is a block diagram showing a hardware configuration of the vehicle lamp information notification device 10. As shown in FIG. 2, the vehicle lamp information notification device 10 includes a central processing unit (CPU, processor) 20, a read-only memory (ROM) 22, a random access memory (RAM) 24, a storage 26, and a communication interface (communication I/F) 28. The configurations are connected via a bus 32 so that they can communicate with each other via the bus 32.

The CPU 20 is a central processing unit, and executes various programs and controls various units. That is, the CPU 20 reads a program from the ROM 22 or the storage 26 and executes the program using the RAM 24 as a work area. The CPU 20 controls each of the above configurations and performs various arithmetic processes according to the program recorded in the ROM 22 or the storage 26.

The ROM 22 stores various programs and various types of data. The RAM 24 serves as a work area and temporarily stores a program or data. The storage 26 is a hard disk drive (HDD) or a solid state drive (SSD), and stores various programs including an operating system, and various types of data. In the present embodiment, the ROM 22 or the storage 26 stores a program for notifying a user, various types of data, etc.

The communication I/F 28 is an interface for the vehicle lamp information notification device 10 to communicate with the server 12 and other devices. For example, standards such as Controller Area Network (CAN), Ethernet (registered trademark), Long Term Evolution (LTE), Fiber Distributed Data Interface (FDDI), and Wi-Fi (registered trademark) are used for the communication I/F 28.

Hardware Configuration of In-Vehicle Device 14

Figure 3:
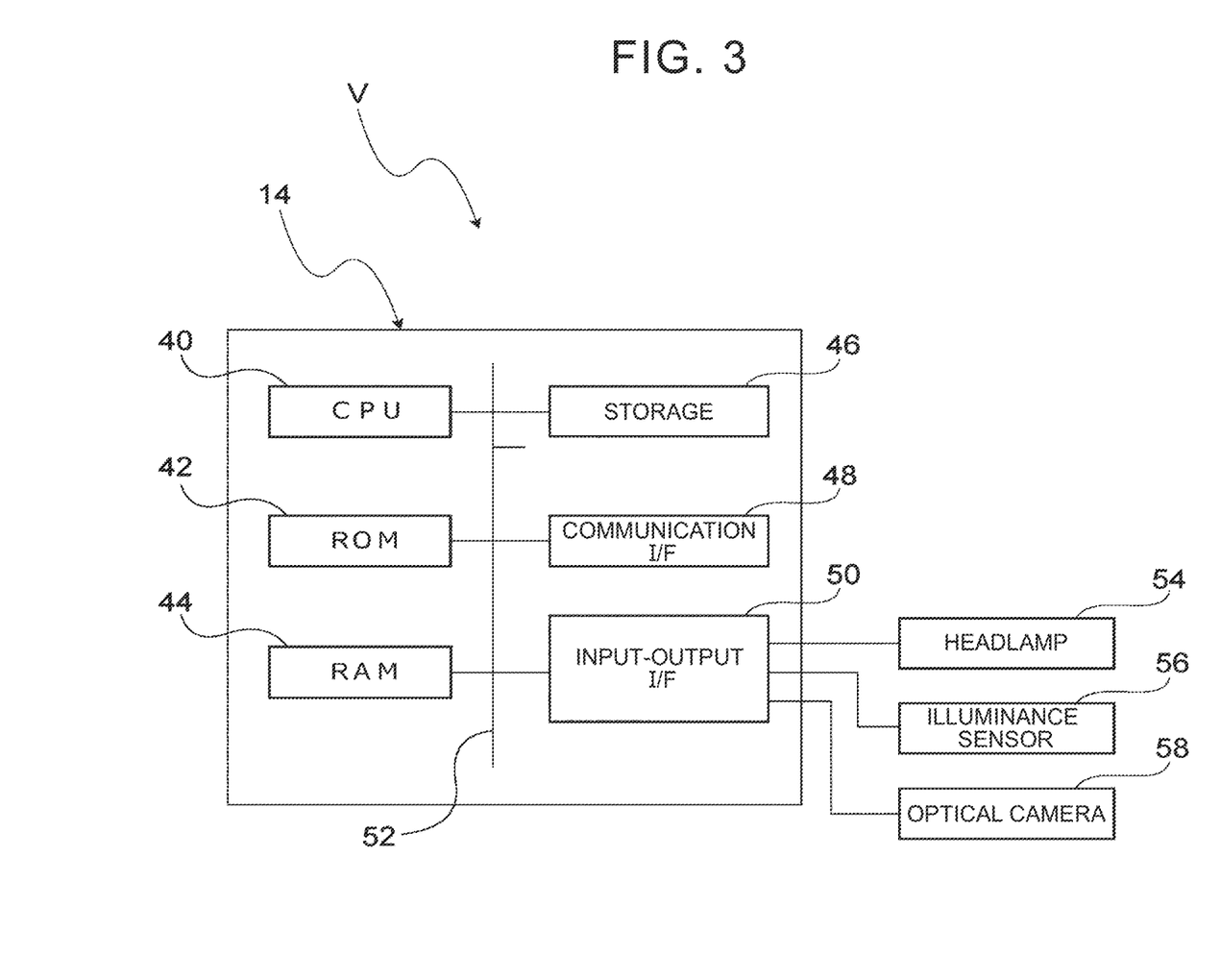
FIG. 3 is a block diagram showing a hardware configuration of an in-vehicle device according to the embodiment.

FIG. 3 is a block diagram showing a hardware configuration of the in-vehicle device 14. As shown in FIG. 3, the in-vehicle device 14 includes a CPU (processor) 40, a ROM 42, a RAM 44, a storage 46, a communication I/F 48, and an input-output interface (input-output I/F) 50. The configurations are connected via a bus 52 so that they can communicate with each other via the bus 52.

The CPU 40 is a central processing unit, and executes various programs and controls various units. That is, the CPU 40 reads a program from the ROM 42 or the storage 46 and executes the program using the RAM 44 as a work area. The CPU 40 controls each of the above configurations and performs various arithmetic processes according to the program recorded in the ROM 42 or the storage 46.

The ROM 42 stores various programs and various types of data. The RAM 44 serves as a work area and temporarily stores a program or data. The storage 46 is an HDD or an SSD, and stores various programs including an operating system, and various types of data. In the present embodiment, the ROM 42 or the storage 46 stores a program for controlling the headlamp 54, various types of data, etc.

The communication I/F 48 is an interface for the in-vehicle device 14 to communicate with the server 12 and other devices. For example, standards such as CAN, Ethernet (registered trademark), LTE, FDDI, and Wi-Fi (registered trademark) are used for the communication I/F 48.

The input-output I/F 50 is electrically connected to the headlamp 54, an illuminance sensor 56, and an optical camera 58.

The headlamp 54 is mounted on both sides of the front of the vehicle V. Namely, a pair of right and left headlamps 54 is mounted on the front of the vehicle V. Information such as total on-time is sent from each headlamp 54 to the in-vehicle device 14.

The illuminance sensor 56 is mounted inside the vehicle V or on the outer surface of the vehicle V, and is configured to detect illuminance. The storage 46 of the in-vehicle device 14 also stores information on accumulated illuminance based on the illuminance acquired from the illuminance sensor 56.

The optical camera 58 is mounted at such a position that it can capture an image of the lens of the headlamp 54. For example, the optical camera 58 may be a small camera mounted inside the headlamp 54. The optical camera 58 captures an image of the lens at predetermined time intervals, and sends image information to the in-vehicle device 14.

Hereinafter, the configuration of the headlamp 54 will be described in detail with reference to FIGS. 5 to 7.

Head Lamp 54

Figure 5:
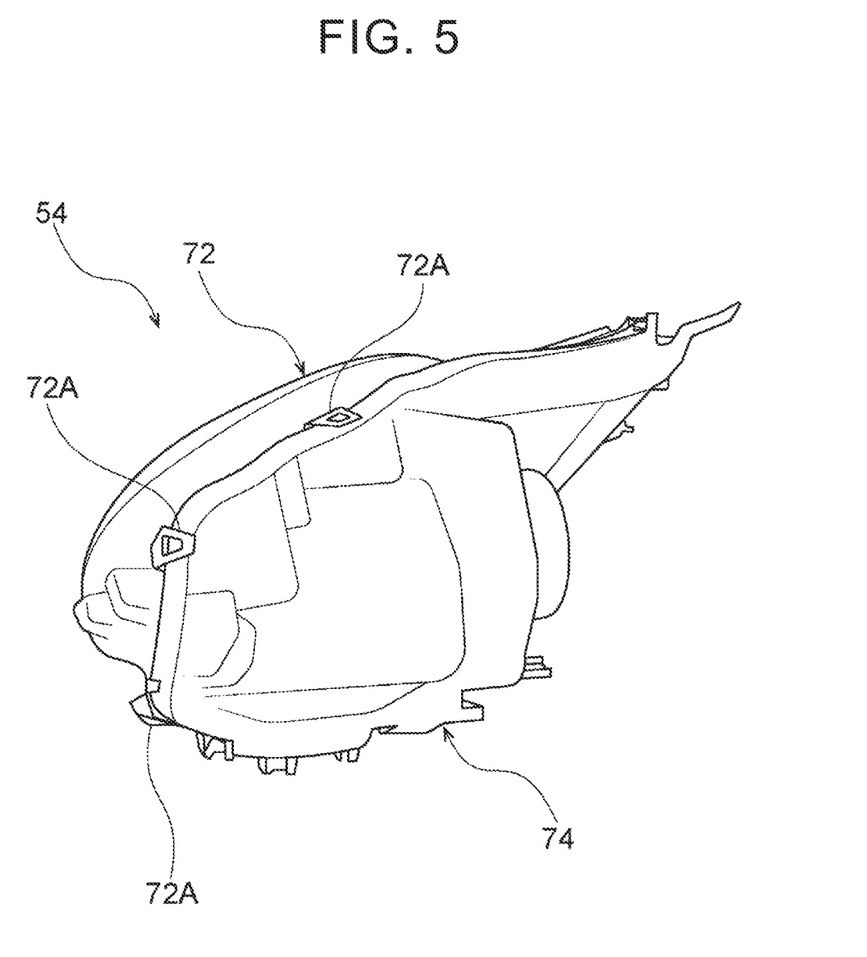
FIG. 5 is a schematic perspective view showing an example of a headlamp according to the embodiment.

As shown in FIG. 5, the headlamp 54 includes a lens 72 and a housing 74. The lens 72 is in such a shape that protrudes forward in the front-rear direction of the vehicle V and opens rearward in the front-rear direction of the vehicle V. The lens 72 has a plurality of tabs 72A along the edge of the opening of the lens 72.

The housing 74 is in such a shape that protrudes rearward in the front-rear direction of the vehicle V and opens forward in the front-rear direction of the vehicle V. The housing 74 has engagement portions (not shown) that engage with the tabs 72A. The lens 72 is mounted on the housing 74 with the engagement portions being retained by the tabs 72A.

Figure 6:
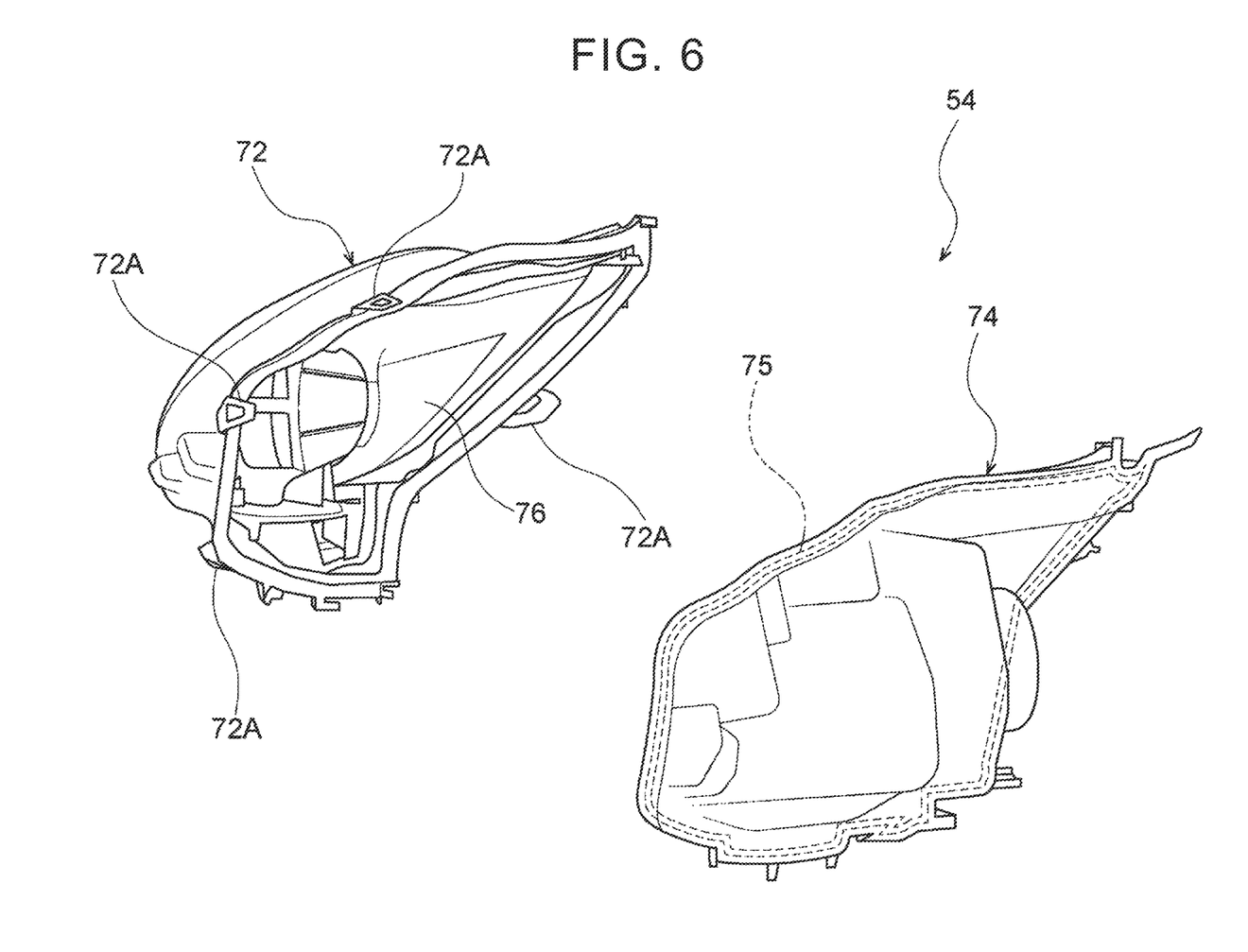
FIG. 6 is an exploded perspective view of the headlamp according to the embodiment.

As shown in FIG. 6, an extension 76 is mounted on the inner surface of the lens 72. The extension 76 is a decorative member. Since the extension 76 is configured to be visible from outside the headlamp 54, the design of the headlamp 54 can be easily changed by changing the shape, color, etc. of the extension 76.

A gasket 75 as a sealing material is detachably mounted on the edge of the opening of the housing 74. The gasket 75 seals between the housing 74 and the lens 72.

Figure 7:
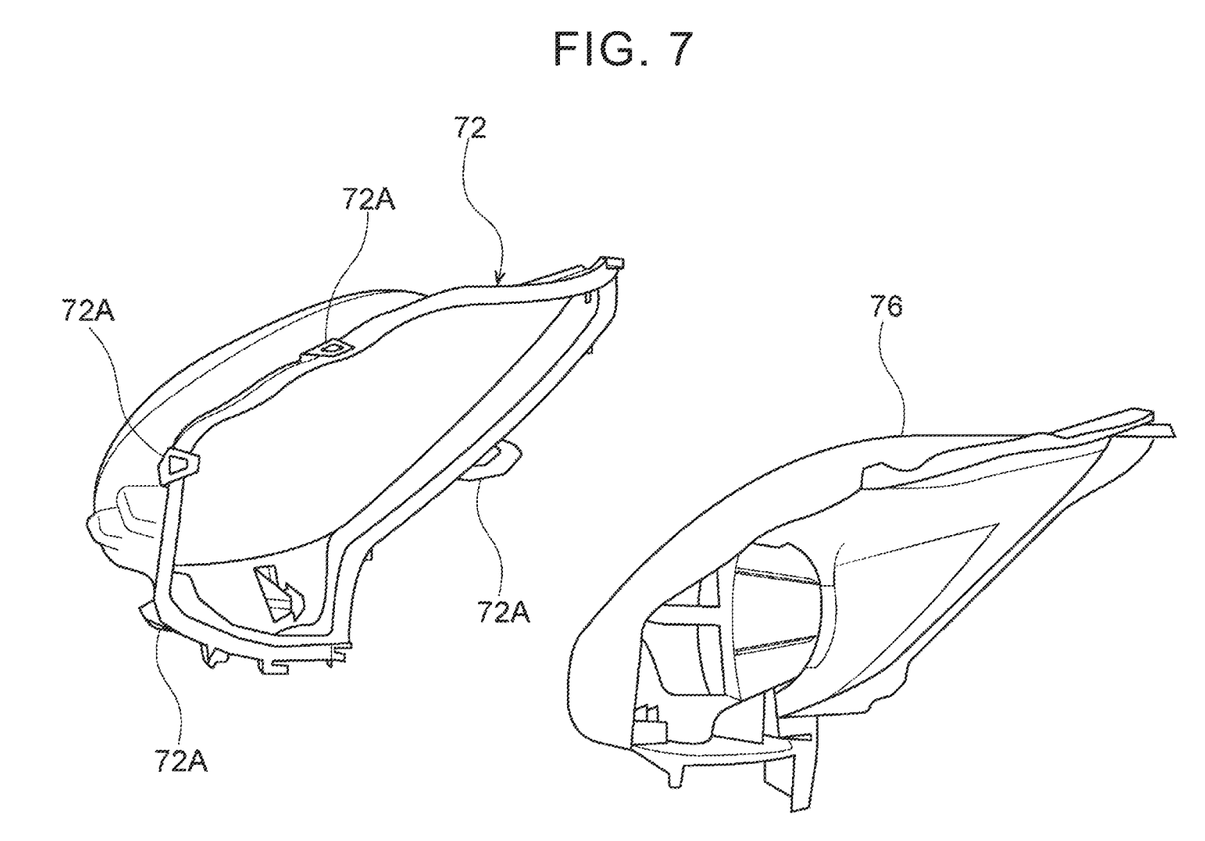
FIG. 7 is an exploded perspective view of a lens according to the embodiment.

As shown in FIG. 7, the extension 76 is detachable from the lens 72. For example, the extension 76 is secured to the lens 72 with fasteners such as screws, and the extension 76 can be removed from the lens 72 by loosening the screws.

Functional Configurations of Vehicle Lamp Information Notification Device 10

The vehicle lamp information notification device 10 implements various functions using the hardware resources shown in FIG. 2. Functional configurations implemented by the vehicle lamp information notification device 10 will be described with reference to FIG. 4.

Figure 4:
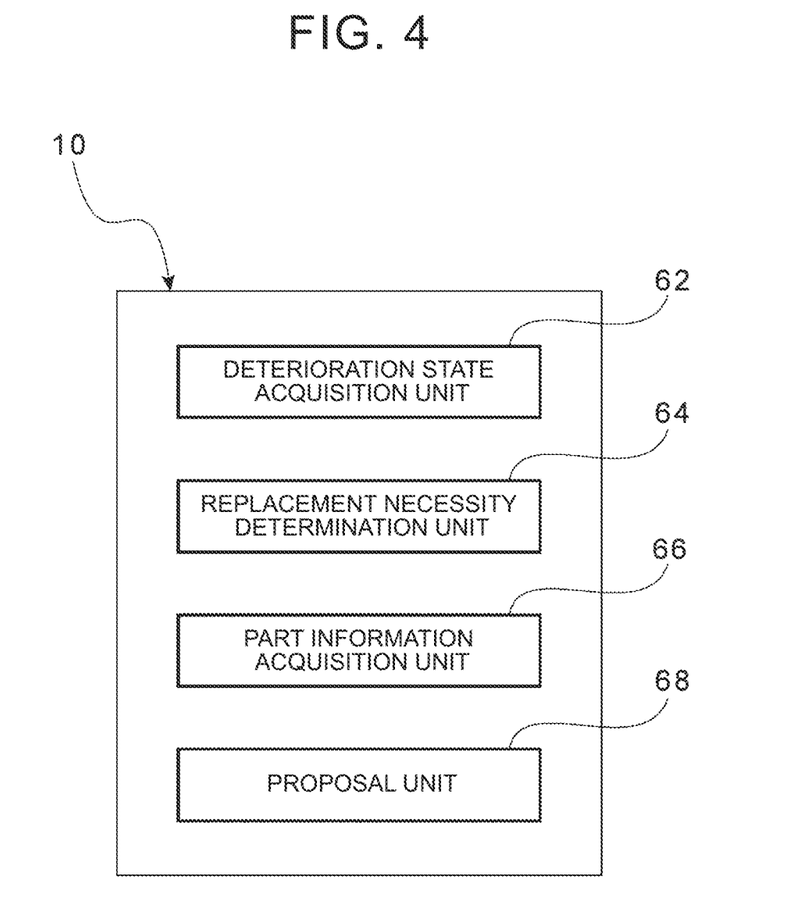
FIG. 4 is a block diagram showing functional configurations of the vehicle lamp information notification device according to the embodiment.

As shown in FIG. 4, the vehicle lamp information notification device 10 includes, as the functional configurations, a deterioration state acquisition unit 62, a replacement necessity determination unit 64, a part information acquisition unit 66, and a proposal unit 68. Each functional configuration is implemented by the CPU 20 reading and executing the program stored in the ROM 22 or the storage 26.

The deterioration state acquisition unit 62 acquires information on the state of deterioration of the headlamp 54. Specifically, the deterioration state acquisition unit 62 acquires information on the state of deterioration of the headlamp 54 stored in the server 12. For example, the deterioration state acquisition unit 62 acquires information such as the total on-time of the headlamp 54, the traveled distance of the vehicle V, the accumulated illuminance calculated based on the data from the illuminance sensor 56, and the image information of the lens 72 captured by the optical camera 58.

The replacement necessity determination unit 64 determines whether the lens 72 needs to be replaced or maintained, based on the information on the state of deterioration of the headlamp 54 acquired by the deterioration state acquisition unit 62. For example, the replacement necessity determination unit 64 may determine that the lens 72 needs to be replaced or maintained when the total on-time of the headlamp 54 is greater than a preset threshold.

For example, separate thresholds may be set for replacement of the lens 72 and maintenance of the lens 72. That is, when the degree of deterioration of the lens 72 is low such as when the lens 72 is clouded, the deterioration can be improved by just maintaining the lens 72 without replacing the lens 72. On the other hand, when the degree of deterioration of the lens 72 is high such as when the lens 72 is yellowed, the lens 72 needs to be replaced. Therefore, the threshold for determining that only maintenance of the lens 72 is necessary to deal with the aged deterioration of the lens 72 is set to a value smaller than the threshold for determining that replacement of the lens 72 is necessary.

The replacement necessity determination unit 64 may determine that the lens 72 needs to be replaced or maintained when the traveled distance of the vehicle V is greater than a preset threshold. In this case as well, separate thresholds may be set for replacement of the lens 72 and maintenance of the lens 72. Determining whether the lens 72 needs to be replaced based only on the traveled distance of the vehicle V eliminates the need to acquire information on the headlamp 54.

The replacement necessity determination unit 64 may determine that the lens 72 needs to be replaced or maintained when the numerical value of the accumulated illuminance is greater than a preset threshold. Since the lens 72 deteriorates due to ultraviolet light etc., the longer the lens 72 is exposed to sunlight, the more the lens 72 deteriorates. Therefore, whether the lens 72 needs to be replaced or maintained can be determined based on the numerical value of the accumulated illuminance.

The replacement necessity determination unit 64 may determine that the lens 72 needs to be maintained when clouding of the lens 72 is observed from the captured image information of the lens 72, and may determine that the lens 72 needs to be replaced when yellowing of the lens 72 is observed from the image information. The state of deterioration of the lens 72 can be directly determined by capturing an image of the lens 72.

The replacement necessity determination unit 64 may comprehensively determine that the lens 72 needs to be replaced or maintained, based on the plurality of items described above. For example, scores may be given to two or more items out of the total on-time of the headlamp 54, the traveled distance of the vehicle V, the accumulated illuminance, and the image information, and it may be determined that the lens 72 needs to be replaced or maintained when the overall score is higher than a predetermined threshold. In this case, even if the accumulated illuminance is low, it can be determined that the lens 72 needs to be replaced or maintained if the score(s) for other item(s) is high.

The part information acquisition unit 66 acquires information on a part for customizing the headlamp 54. Specifically, the part information acquisition unit 66 acquires information on the extension 76 of the headlamp 54 from a server etc. storing the information on the extension 76. At this time, the part information acquisition unit 66 may acquire only the information on the extension 76 that is applicable to the vehicle V. For example, the part information is information on the shape, color, etc. of the extension 76.

The proposal unit 68 proposes replacement or maintenance of the lens 72 and also proposes customization of the headlamp 54. In the present embodiment, for example, the proposal unit 68 proposes maintenance of the lens 72 and customization of the headlamp 54 when the replacement necessity determination unit 64 determines that the lens 72 needs to be maintained. The proposal for customization of the headlamp 54 is made based on the information acquired by the part information acquisition unit 66.

The proposal unit 68 proposes replacement of the lens 72 and customization of the headlamp 54 when the replacement necessity determination unit 64 determines that the lens 72 needs to be replaced. For example, the proposal by the proposal unit 68 is provided by displaying the proposal on a display unit installed in a vehicle cabin of the vehicle V. The proposal unit 68 may propose replacement or maintenance of the lens 72 by sending a message to a mobile terminal etc. carried by the user of the vehicle V.

Operations

Next, operations of the present embodiment will be described. Headlamp Information Notification Process (Vehicle lamp Information Notification Process)

Figure 8:
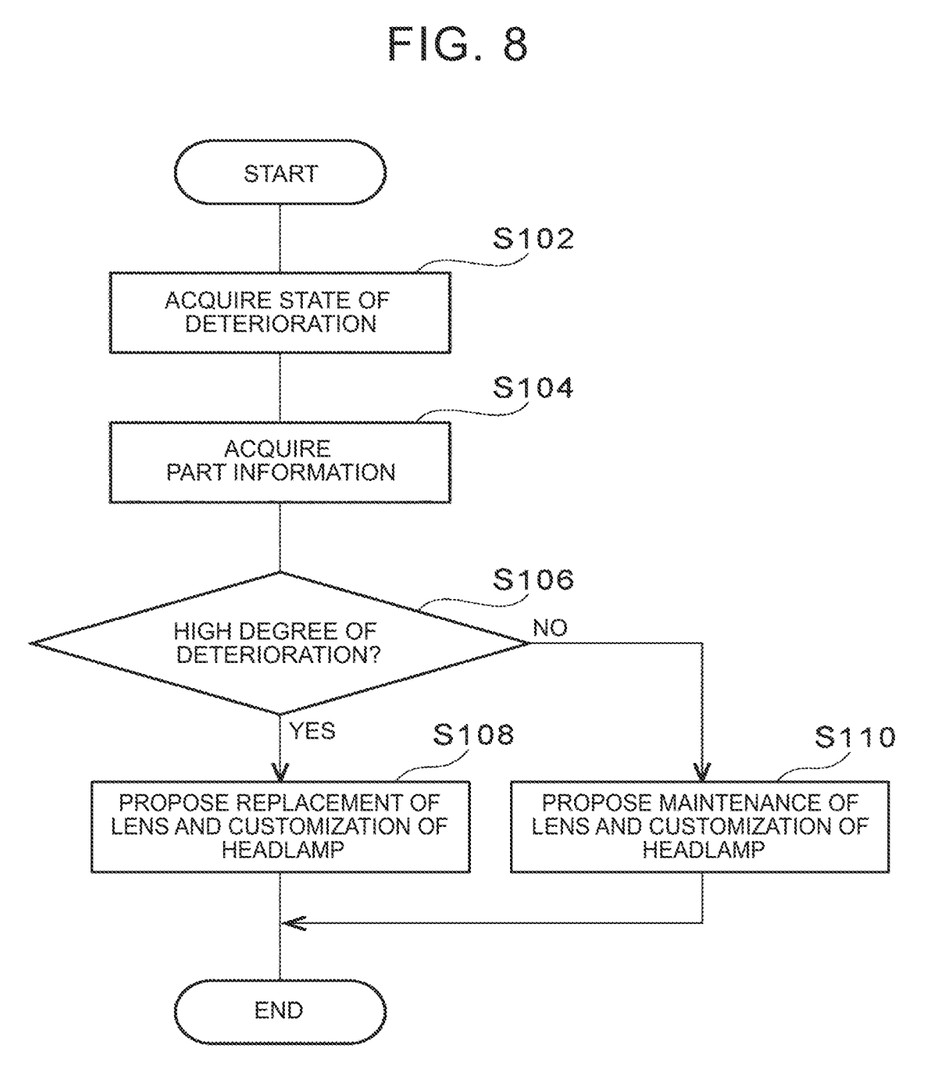
FIG. 8 is a flowchart showing an example of the flow of a headlamp information notification process according to the embodiment.

An example of the flow of a headlamp information notification process that is performed by the vehicle lamp information notification device 10 will be described with reference to the flowchart shown in FIG. 8. This process is implemented by the CPU 20 reading and executing the program stored in the ROM 22 or the storage 26. In the present embodiment, for example, this process is performed at the timing when the vehicle V is started, at the timing when the vehicle V comes to a stop, or at predetermined time intervals.

In step S102, the CPU 20 acquires information on the state of deterioration of the headlamp 54. Specifically, the CPU 20 acquires information on the state of deterioration of the headlamp 54 from the server 12 using the function of the deterioration state acquisition unit 62.

In step S104, the CPU 20 acquires part information. Specifically, the CPU 20 acquires information on the extension 76 from an external server etc. using the function of the part information acquisition unit 66.

In step S106, the CPU 20 determines whether the degree of deterioration of the headlamp 54 is high. When the CPU 20 determines that the degree of deterioration of the headlamp 54 is high based on the information acquired by the deterioration state acquisition unit 62, the process proceeds to step S108.

In step S108, the CPU 20 proposes replacement of the lens 72 and customization of the headlamp 54. Specifically, the CPU 20 proposes replacement of the lens 72 using the function of the proposal unit 68. The CPU 20 also proposes customization of the headlamp 54 using the function of the proposal unit 68. The headlamp information notification process thus ends. The information on the extension 76 may be notified at this time.

On the other hand, when the CPU 20 determines in step S106 that the degree of deterioration of the headlamp 54 is not high based on the information acquired by the deterioration state acquisition unit 62, the process proceeds to step S110.

In step S110, the CPU 20 proposes maintenance of the lens 72 and customization of the headlamp 54. Specifically, the CPU 20 proposes maintenance of the lens 72 using the function of the proposal unit 68. The CPU 20 also proposes customization of the headlamp 54 using the function of the proposal unit 68. The headlamp information notification process thus ends. The information on the extension 76 may be notified at this time.

As described above, the vehicle lamp information notification system S including the vehicle lamp information notification device 10 of the present embodiment proposes replacement or maintenance of the lens 72 based on the information on the state of deterioration of the headlamp 54 of the vehicle V. This can encourage the user to have the lens 72 replaced or maintained. In particular, deterioration of the lens 72 may reduce the illuminance of light emitted forward in the front-rear direction of the vehicle V from the headlamp 54. Therefore, the safety performance of the vehicle V can be maintained by regularly encouraging replacement or maintenance of the lens 72.

Moreover, proposing customization of the headlamp 54 at the same time as proposing replacement or maintenance of the lens 72 can encourage the user to have the headlamp 54 customized at the timing of replacement or maintenance of the lens 72. As described above, by proposing customization of the headlamp 54 at the same time as proposing actions to be taken to deal with aged deterioration of the headlamp 54, it is possible to differentiate from companies etc. that only deal with aged deterioration of the headlamp 54. That is, it is possible to provide a differentiated service when dealing with aged deterioration of the headlamp 54. It is also possible to save the user the trouble of separately having the headlamp 54 customized.

In particular, in the present embodiment, different proposals are provided depending on the degree of deterioration of the lens 72. Therefore, aged deterioration of the headlamp 54 can be improved by a method with less burden on the user. For example, when the degree of deterioration of the lens 72 is low such as when the lens 72 is clouded, the deterioration can be improved without replacing the lens 72. An example of a method for maintaining the lens 72 is to polish a hard coating covering the surface of the lens 72. This eliminates irregularities on the surface of the hard coating, thereby eliminating the clouding. Another example of the method is to attach a sheet to the surface of the lens 72. This also eliminates irregularities on the surface of the hard coating, thereby eliminating the clouding. These methods can eliminate the aged deterioration without disassembling the headlamp 54. These methods may be combined.

On the other hand, when the degree of deterioration of the lens 72 is high such as when the lens 72 is yellowed, the lens 72 needs to be replaced. Therefore, providing different proposals depending on the degree of deterioration of the lens 72 makes it easier for the user to estimate the cost required to improve the aged deterioration of the lens 72. This also allows the user to determine whether the headlamp 54 needs to be disassembled.

In the present embodiment, replacement or maintenance of the lens 72 is proposed based on at least one of the following: the total on-time of the headlamp 54, the traveled distance of the vehicle V, the integrated illuminance, and the captured image information of the lens 72. This improves the accuracy of estimating the degree of aged deterioration of the lens 72 compared with the case where, for example, the degree of aged deterioration of the lens 72 is determined based only on the number of days of use.

In addition, in the present embodiment, information on the extension 76 for customization of the headlamp 54 is acquired. It is therefore possible to propose customization suitable for the vehicle V owned by the user.

Moreover, the headlamp 54 of the present embodiment is configured so that the lens 72 is detachable from the housing 74 and both the lens 72 and the gasket 75 are replaceable. Therefore, only the lens 72 can be easily replaced without replacing the entire headlamp 54.

Although the vehicle lamp information notification system S and the vehicle lamp information notification device 10 according to the embodiment are described above, it should be understood that the present disclosure can be carried out in various forms without departing from the scope of the disclosure. For example, the configuration that acquires the state of deterioration of the headlamp 54 as a vehicle lamp is described in the above embodiment. However, the present disclosure is not limited to this, and may be applied to a fog lamp that is an auxiliary lamp.

What is claimed is:

1. A vehicle lamp information notification device comprising, a central processing unit configured to:
   acquire information on a state of deterioration of a vehicle lamp of a vehicle, and
   propose replacement or maintenance of a lens of the vehicle lamp and also propose customization of the vehicle lamp, based on the information.

2. The vehicle lamp information notification device according to claim 1, wherein the central processing unit is configured to propose the maintenance of the lens when a degree of deterioration of the lens is low, and is configured to propose the replacement of the lens when the degree of deterioration of the lens is high.

3. The vehicle lamp information notification device according to claim 1, wherein the central processing unit is configured to propose the replacement or the maintenance of the lens based on at least one of the following: total on-time of the vehicle lamp, a traveled distance of the vehicle, accumulated illuminance, and captured image information of the lens.

4. The vehicle lamp information notification device according to claim 1, wherein the central processing unit is configured to acquire part information for the customization of the vehicle lamp, and is configured to propose the customization of the vehicle lamp based on the acquired part information.

5. A vehicle lamp information notification system, comprising:
   the vehicle lamp information notification device according to claim 1; and
   the vehicle including the vehicle lamp.

6. The vehicle lamp information notification system according to claim 5, wherein
   the lens of the vehicle lamp is configured to be replaced, and
   a sealing material that seals between the lens and a housing is configured to be replaced.

7. A vehicle lamp information notification method, comprising:
   acquiring information on a state of deterioration of a vehicle lamp of a vehicle; and
   proposing replacement or maintenance of a lens of the vehicle lamp and also proposing customization of the vehicle lamp, based on the information.

8. A non-transitory storage medium storing instructions that are executable by one or more processors and that cause the one or more processors to perform functions comprising:
   acquiring information on a state of deterioration of a vehicle lamp of a vehicle; and
   proposing replacement or maintenance of a lens of the vehicle lamp and also proposing customization of the vehicle lamp, based on the information.

* * * * *